Patented July 12, 1932

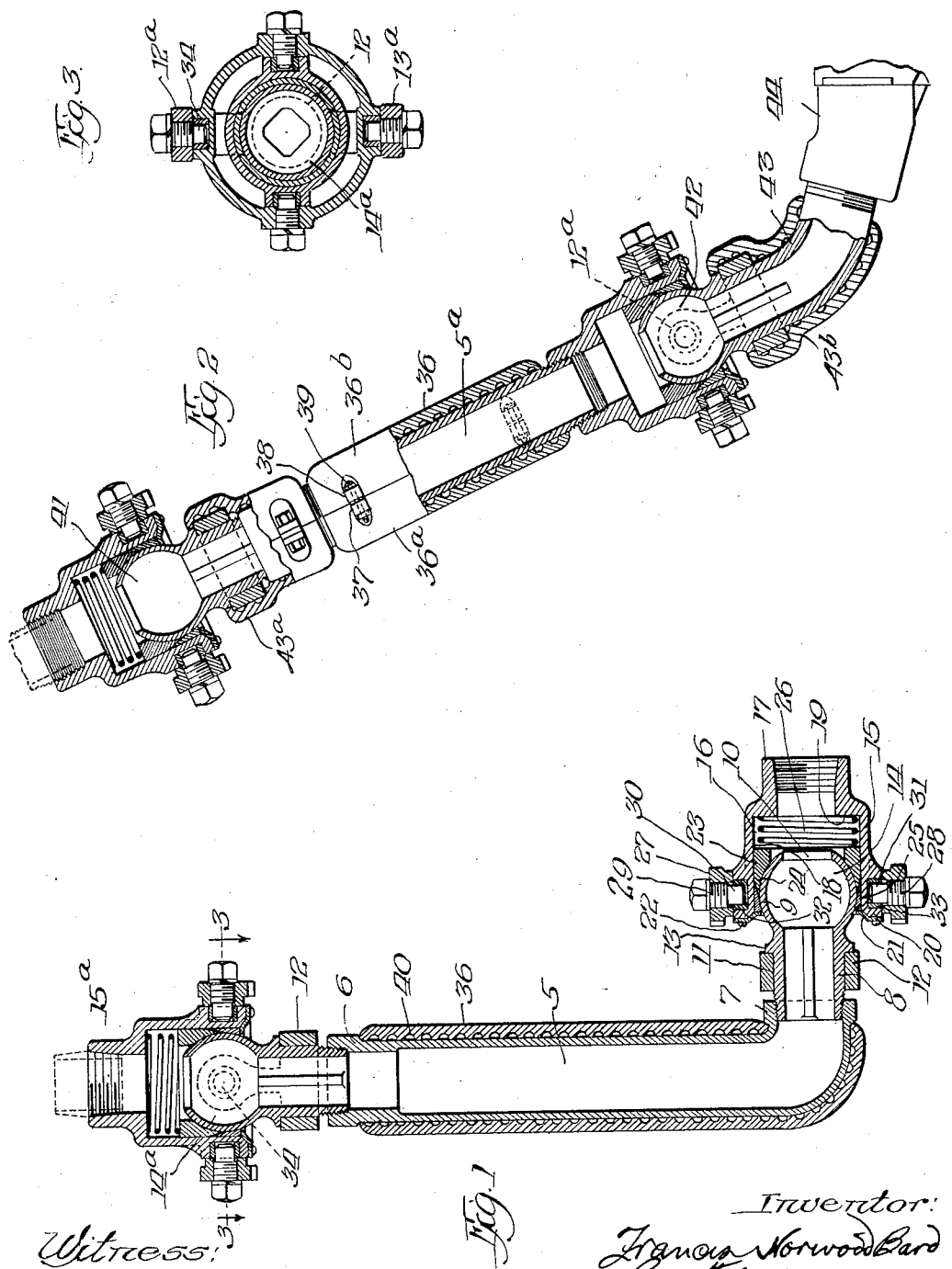

1,866,835

UNITED STATES PATENT OFFICE

FRANCIS NORWOOD BARD, OF HIGHLAND PARK, ILLINOIS

PIPE COUPLING AND INSULATION THEREFOR

Application filed November 15, 1926. Serial No. 148,435.

This invention relates broadly to fluid conductors and, more particularly, to improvements in flexible conductors and has special reference herein to separable pipe coupling elements for employment in connecting steam lines and the like between the relatively movable elements of a railway train.

This invention includes, more particularly, improvements in protective coverings for fluid conductors, more particularly of a rigid type and where employed in the open air and subject to shocks and vibration, whereby to provide an improved form of heat insulating and protective covering for the sections of a flexible conduit.

While the invention is described and illustrated for use as a car connection, it will be understood that it finds a wide field of utility for other analogous purposes.

This invention includes an improved flexible joint construction and packing therefor, in addition to the heat insulating protective covering.

The principal objects and advantages of the present invention reside in the provision generally of an improved coupling characterized by relative angular displacement of the sections; the provision of an improved substantially universal joint for employment in pipe couplings and the like; the provision of an improved packing for pipe couplings for employment in the joints thereof and for analogous purposes; the provision generally of an improved pipe coupling embodying therein an improved form of heat insulating and protective covering; and the provision, in a device of the character referred to, of an improved compact and unitary structure which may be inexpensively manufactured and possesses long life in service.

The foregoing, and such other objects and advantages as may appear or be pointed out as this description proceeds, are attained in the structural embodiment illustrated in the accompanying drawing, in which:

Figure 1 is a vertical, sectional view of a flexible fluid conductor embodying the improvements of this invention, and Figure 2 is a similar view of an alternative form of the invention, and Figure 3 is a transverse sectional view taken on the line 3—3 of Figure 1 looking in the direction indicated by the arrows.

The present invention is, in general, adapted for the same purpose as, and is in some respects similar to, the device of my invention described and claimed in application Serial No. 148,433, filed Nov. 15, 1926, the improvements here described having more particularly to do with the improved form of joint and the improved heat insulating and protecting covering for the pipe sections.

Referring first, in detail, to Figure 1, I provide a rigid section 5 formed of a suitable metal, said pipe section 5 being enlarged in wall thickness at its ends, as indicated at 6 and 7, one end, namely that indicated at 7, being bent at substantially right angles to the main portion 5 of the pipe and internally threaded to receive a nipple 8 which latter is enlarged and properly formed on its outer end to afford a hollow ball portion 9, having concentric opening 10. The nipple 8 is further provided with a cylindrical outer surface, as at 11, and a ring 12 engages said outer surface and abuts a shoulder 13 on said nipple. The ring 12 is formed with a pair of lugs, indicated at 12$^a$ and 13$^a$, which lie substantially parallel to the longitudinal axis of the nipple and are spaced away from the ball 9 for a purpose which will presently appear.

The ball and nipple portions form one of the moving parts of a universal joint, generally designated 14, and including with said nipple a ball and casing or socket member 15 substantially universally angularly displaceable with respect to the nipple and ball and formed with a chamber 16 for receiving the ball and a reduced internally threaded portion 17 for connection either directly to a coupler head of a conventional form or to an adjacent pipe section.

The chamber 16 is formed with an internally cylindrical surface 18 terminating at an annular shoulder 19 at the inner end of said chamber.

The end of the casing presented toward the ball, and which receives the ball, is provided with an annularly enlarged portion 20 upon which is mounted a retaining ring 21 held in place by a plurality of screws 22 passing therethrough.

The ring 21 is bent angularly inwardly toward the chamber 16 and projects peripherally beyond the surface 18 but in spaced relationship to the surface of the ball 9.

A packing is provided which serves the usual function of a packing and also has a seat for the ball 9 and forms the retaining means therefor, this packing including the major annular portion 23 formed with a tapering portion 24 which extends between the ball and the complemental tapering packing element 25. These two packing members 23 and 25 cover so much surface of the ball as will be sufficient to prevent its withdrawal from the chamber 16 and at the same time prevent any tendency of the ball to enter further into the chamber.

The ring 21 abuts the wedge packing section 25 and a helical spring 26 lies within the chamber 16 between the inner end of the wedge packing member 23 of the shoulder 19, thus tending to force the two packings together upon the surface of the ball.

While the packing member 25 and the ring 21 in an emergency will prevent the ball from lifting off its seat, I prefer to employ auxiliary retaining means in the nature of a yoke universal joint structure, and to this end I provide, as best shown in Figure 3, an annular member 27 which encircles the enlarged portion 20 of the casing 15 and is fulcrumed for angular displacement on said casing by the provision of cap screws 28 and 29 threaded into said annular member 27 and having plain fulcrum portions 30 and 31 received in bearing bushings 32 and 33 seating in suitable recesses diametrically oppositely arranged in the portion 20 of the casing 15. The bushings 32 and 33 may be of relatively hard metal so as to reduce the wear in service to a minimum.

The annular member 27, at points equidistantly spaced from the fulcrum members 28 and 29 is provided with auxiliary fulcrums 34 which receive the lugs 12a and 13a on the ring 12, thereby affording a universally angularly displaceable joint for supporting the nipple. This arrangement of the annular member 27 and lugs 12a and 13a removes a large portion of the strain from the packing members and allows these members to function freely as packing elements without undue strain which would be imposed thereon where they relied upon solely to function additionally as retaining means for the ball.

In Figure 1 it will be observed that the casing 15a of the upper universal joint 14a is disposed with its longitudinal axis in a plane substantially at right angles to that of the casing 15 of the joint 14. This finds utility when employed in connection with the pipe coupling described and claimed in my application Serial No. 148,433, wherein the pipe sections are disposed in normal condition substantially in vertical and horizontal planes respectively.

In order to protect the pipe section 5 against the elements and against undue shocks and vibration when installed as a car connection between the cars of a railway train, I provide a protective housing or casing 36 which is formed preferably of molded fibre or other tenacious moldable material and is preferably formed in two separable sections 36a and 36b provided each with lugs 37 and 38 through which portions bolts 39 pass for securing these sections in position on the pipe section.

By providing the molded sections, I am enabled to apply them to pipe sections of any desired shape or contour, as will be observed from Figure 1, wherein the sections substantially completely cover all of the exposed and vulnerable parts of the pipe section 5. In order to prevent sweating of the pipe 5 and collection of moisture and a consequent freezing in cold weather and a resultant fracture, I provide on the inner surfaces of the sections 36a and 36b one, or a plurality of spiral channels 40 which extend throughout the length of the protective covering and serve to conduct water of condensation, or fluid of any kind, away. Furthermore, this arrangement tends to render the coverings slightly resilient so that they more readily expand and contract without fracture when necessary in operation.

Referring now to the form of the invention shown in Figure 2, an adaption of the improved joint and improved protective housing or covering is shown wherein the pipe section 5a is disposed at an inclination to the vertical, and the whole pipe coupling includes the universal joint 41, substantially identical with the joints 14 and 14a shown in Figure 1, universal joint 42, curved pipe section 43 and a coupler head 44.

The end of the protective casings is such, as shown in Figure 2, that they may be applied to pipe sections of various sizes and shapes as desired. It will be appreciated that a protective covering, such as shown at 36 in Figures 1 and 2, might be extended to cover the nipple portions 8 or the casings 15 and to cover the curved pipe section 43, an example of such a covering appearing at 43a and 43b in Figure 2. The reasons such application of the protective coverings is not shown is that the increased thickness of the nipples, casings, and the pipe section 43 do not, in some instances, require a heat insulating or other covering, but it will be understood that it is within the spirit of this invention to apply such coverings to these elements.

Having thus described my invention and illustrated its use, what I claim as new and desire to secure by Letters Patent is:

In a universal joint, a socket member having an open end, a multiple part ball seat in said socket, a ball member engaging said seat, means angularly displaceable with respect to said socket for supporting the ball and socket in operative relation, and removable means on the open end of said socket member for retaining the parts of said seat irrespective of said angularly displaceable means.

In testimony whereof I have hereunto signed my name.

FRANCIS NORWOOD BARD.